United States Patent
Blisson

(10) Patent No.: US 7,671,623 B2
(45) Date of Patent: Mar. 2, 2010

(54) DEVICE FOR MANAGING THE CONSUMPTION PEAK OF A DOMAIN ON EACH POWERING-UP

(75) Inventor: Fabrice Blisson, Montbonnot Saint Martin (FR)

(73) Assignee: STMicroelectronics S.A., Montrouge (FR)

( * ) Notice: Subject to any disclaimer, the term of this patent is extended or adjusted under 35 U.S.C. 154(b) by 393 days.

(21) Appl. No.: 11/701,973

(22) Filed: Feb. 2, 2007

(65) Prior Publication Data
US 2007/0257705 A1 Nov. 8, 2007

(30) Foreign Application Priority Data
Feb. 3, 2006 (FR) .................................. 06 01015

(51) Int. Cl.
*H03K 17/16* (2006.01)
(52) U.S. Cl. ........................................................ 326/33
(58) Field of Classification Search .................... 326/33
See application file for complete search history.

(56) References Cited

U.S. PATENT DOCUMENTS

| 6,803,805 | B2 | 10/2004 | Wang et al. | |
|---|---|---|---|---|
| 7,279,927 | B2 * | 10/2007 | Falkowski et al. | ............. 326/33 |
| 2005/0105307 | A1 | 5/2005 | Shearon et al. | |
| 2006/0184808 | A1 * | 8/2006 | Chua-Eoan et al. | ......... 713/300 |

FOREIGN PATENT DOCUMENTS

WO WO 02/061909 A2 8/2002

OTHER PUBLICATIONS

Preliminary French Search Report, FR 06 01015, dated Oct. 5, 2006 along with an Opinion of Patentability (in French).
Royannez, et al. "90nm low leakage SoC design techniques for wireless applications" Solid State Circuits Conference, 2005, Feb. 6-10, 2005, ISBN: 0-7803-8904-2.

* cited by examiner

*Primary Examiner*—Rexford N Barnie
*Assistant Examiner*—Thienvu V Tran
(74) *Attorney, Agent, or Firm*—Gardere Wynne Sewell LLP

(57) ABSTRACT

A device is provided for managing the current consumption peak on each powering-up of a domain in an electronic circuit. A plurality of domains are present and a global power supply grid provides power. Each domain is selectively supplied by a local supply grid connected to the global supply grid via a plurality of commanded switch transistors. A pre-charge transistor is used to pre-charge a domain at powering-up. A command circuit controls operation of the switch transistors through an analog command signal whose slew rate is controlled to ensure that switch transistor conduction is delayed to enable the pre-charge circuit to charge the domain to a sufficient degree that activation of the switch transistor will not draw excessive current. A detection circuit is configured to compare the instant value of the supply voltage with a fixed reference supply voltage and/or to compare, with the value of a fixed command voltage, the instant value of the differential voltage between the global supply voltage and the command voltage.

22 Claims, 5 Drawing Sheets

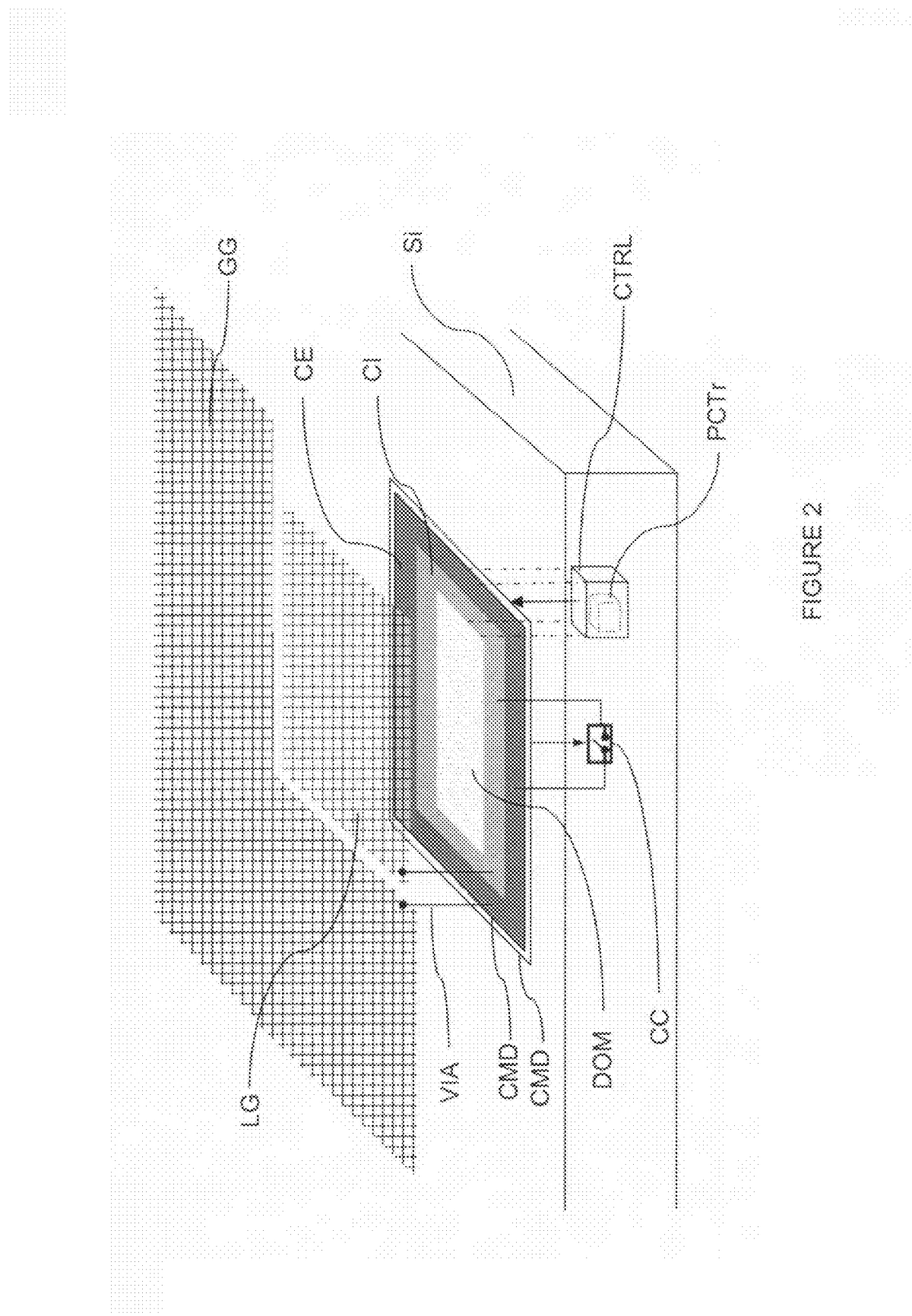

DEVICE FOR MANAGING THE
CONSUMPTION PEAK OF A DOMAIN ON
EACH POWERING-UP

PRIORITY CLAIM

This application claims priority from French Application for Patent No. 06 01015 filed Feb. 3, 2006, the disclosure of which is hereby incorporated by reference.

BACKGROUND OF THE INVENTION

1. Technical Field of the Invention

The present invention relates to SOC systems ("System-On-Chip").

2. Description of Related Art

SOCs are the result of integrating a more complete system on one same chip. Several circuits are grouped together on one same chip to form a single electronic component, thereby avoiding having to use several chips to group the different circuits contributing towards the functioning of one same unit.

Each constituent block of a SOC is called an IP block (for Intellectual Property). An IP block is a virtual assembly of components representing the component integration know-how of a company (semiconductor manufacturer or other). The function to be integrated may be a physical, material function, or a software function (or both at the same time) of specific components. Conventionally, a distinction is made between types of blocks:

so-called "soft" IP blocks (for "software"), with a VHDL model for example (language for computer assisted design allowing a circuit to be modeled and simulated at different abstraction levels) which is used to the synthesize the circuit using a library of pre-characterized cells, and so-called "hard" IP blocks (for "hardware") with a technology-targeted layout.

A third type of IP block, i.e., memories, can be added to these two block types.

SOC systems are likely to play an increasingly greater role in the telecommunications sector in particular. They form a fundamental technology for telecommunications equipment and determine the services which this equipment is able to provide. Technological advance has led to the commercial development of portable systems, i.e., battery-operated. Battery-run products require a sufficient reserve time. This reserve time can be increased by energy savings systems. e.g. idle or standby modes which are currently insufficient.

In parallel, the development of SOCs must also meet requirements for control of circuit consumption.

Several techniques intended to control consumption have been introduced. The principle developed here is not to place the circuit in idle mode but to cut off the power supply to the circuit, or part thereof, when the product or part thereof is not in use.

For as long as it receives power, an electronic circuit consumes energy even if it is not active, chiefly through leakage currents which are responsible for static consumption by the circuit. These leakage currents are increased with the decreasing size of components (transistors).

To optimize power distribution, and hence to save power, solutions have been put forward to split a circuit into several portions and to cut off the power supply to only part of the circuit, i.e., in one or more portions of the circuit not in use.

The electronic system developed in this manner consists of managing several power supply domains, the SOC being provided with means to cut off the supply to inactive parts (domains) of the circuit, while others remain active and hence are powered.

An SOC is an electronic circuit able to execute several functions, e.g., audio and/or video reading on a mobile telephone. Under normal conditions of use, all functions executable by the SOC are not executed simultaneously.

A function is executed by an IP block for example, or by a plurality of IP blocks.

An SOC is also designed as a circuit comprising a sum of power supply domains, called domains. A domain is therefore a sub-part of the SOC system and corresponds to one or several IP blocks, optionally even to only one part of a block in the case of a "soft" IP block.

A domain is therefore able to perform or execute one or more functions and a function may be performed or executed by one or more domains. However, as a general rule, a function is equivalent to a domain.

Power saving consists of cutting off the supply to areas corresponding to a non-used function, which in most cases amounts to cutting off the supply to the domain responsible for the function not in use.

The problem associated with this form of functioning lies in each powering-up of a switched-off domain. It is necessary to control the current consumption peak of the domain so as to avoid damage thereto, and more especially so as not to penalize other domains that are in use, the consumption peak being the peak observed on each powering-up of the domain and used to charge its equivalent capacity.

The prior art contains the document "90 nm low leakage SOC design techniques for wireless applications" published by IEEE (ISBN 0-7803-8904-2/05) under reference ISSCC 2005/SESSION 7/MULTIMEDIA PROCESSING/7.6. The solution proposed in this document consists of designing a SOC system comprising several supply domains and using several modes to save on power supply. The electric supply is distributed using a standard meshing system: a global network to distribute power supply and ground supply throughout the entire SOC, and a sum of local networks reflecting the partitioning into domains. The global network is linked to the local networks via a certain number of switches.

These switches are incorporated inside the domains, staggered at a regular pitch, or around "hard" IP blocks, or both. They operate in cascade one after the other. The switches are embedded inside the domain, in the standard cells, and each switch consists of two PMOS transistors.

A standard cell is a cell which provides a basic logic function, e.g., a CMOS inverter. A "soft" IP block corresponds to an assembly layout of a plurality of standard cells.

The problem with this configuration is that, to ensure power supply, one must reach inside a block of standard cells, inside the domain. In addition, the consumption peak is not fully controlled, since consumption depends in particular on the sequence switching speed of the switches.

There is a need in the art to overcome this shortcoming by proposing a different architecture with which it is possible to power a standard supply domain selectively, while controlling the current consumption peak.

SUMMARY OF THE INVENTION

To address the foregoing need in the art, as well as other needs, the present invention concerns a device for managing the current consumption peak on each powering-up of a domain in an electronic circuit wherein the circuit comprises a plurality of domains and a global supply grid, each domain being selectively supplied by a local supply grid connected to the global supply grid via a power switch commanded by command means.

This device comprises at least one pre-charge transistor mounted in parallel with the power switch, and command means of the switch transistors which are configured to generate an analog command signal whose slew-rate is controlled by control means.

Preferably, the power switch comprises at least one switch transistor.

In the preferred embodiment, the pre-charge transistor or transistors are configured to operate in saturation mode on each powering-up of the domain, so that they function as a current source delivering a determined maximum intensity.

Preferably, the power switch comprises a plurality of switch transistors, and their number is chiefly determined in relation to the consumption of the domain to be supplied.

In one embodiment, the maximum intensity delivered by the pre-charge mechanism is determined in relation to the equivalent capacity of the supply domain and/or to the desired duration of the wake phase (powering up) of the supply domain.

Advantageously, the value of the maximum intensity delivered by the pre-charge transistors is dynamically adaptable, by selecting the number of active pre-charge transistors or their size. In the preferred embodiment, each domain comprises one to four pre-charge transistors.

Also, the slew-rate control means are advantageously adaptable.

Preferably, the adaptation of slew-rate control is correlated with the pre-charge mechanism so as to have a high slew-rate of the command signal when the pre-charge delivers a strong current, and a low slew-rate of the command signal when the pre-charge delivers a weak current.

Advantageously, the slew-rate mechanism is such that the grid of transistors of the power switch is supplied with a constant current.

The slew-rate control mechanism is advantageously adapted in relation to the maximum intensity delivered by the pre-charge mechanism.

Preferably, the slew-rate control means are configured so that the current passing through the power switch, at the time of powering-up, is at all times lower than the maximum intensity delivered by the pre-charge means.

Preferably, the time required by the slew-rate control mechanism to achieve switching (threshold voltage) of the power switch is substantially equal to the time needed by the pre-charge mechanism to deliver most of the total charge to be sent to the supply domain in order to charge its equivalent capacity.

Advantageously, the device of the invention is configured so that the maximum charge delivered by the pre-charge transistors is approximately equal to 80% of the total charge of the domain to be charged.

Advantageously, the number of switch transistors in the power switch—or their size, i.e., their W/L ratio between the width W of the channel and its length L—depends on the operating current of the domain. Preferably, the switch transistors are PMOS transistors, identical per domain and whose number per domain may vary.

With the configuration of the invention, the total charge time of a domain may be known in advance.

In one embodiment, the device of the invention also comprises detection means, integrated in the command means, and configured to compare the instant value of the supply voltage to the supply domain with the value of a fixed reference supply voltage and/or to compare the instant value of the command voltage with the value of a fixed command voltage.

Preferably, the supply voltage and the reference command voltage are both the supply voltage of the global supply grid.

Typically, the command current of the power switch is the command current of the switch transistor grids of the power switch.

On a structural level, the device of the invention is such that the power switch and/or the pre-charge switches are advantageously mounted on the periphery of the domain.

Preferably, the global routing grid is positioned in the higher metallization layers of the circuit, and the power switch is positioned in the silicon underneath the lower metallization layers.

Also preferably, the structure of the device of the invention comprises supply rings. These supply rings are metallization rings. Preferably, they are positioned in the lower metallization layers. In the preferred embodiment, they are positioned in the second metallization layer, the first layer being used in this case as a connector with the switch.

In one embodiment, the device of the invention therefore also comprises at least one first outer supply ring supplying outside power to the domain, by connection between this outer metallization ring and the global supply grid, and a second inner supply ring supplying inside power to the domain, by connection between this inner metallization ring and the local supply grid, one of these rings being connected to the input and the other to the output of the switch transistors.

Preferably, the input of the power switch is connected to the outer ring, and the output to the inner ring. The connection may possibly be reversed to position the power switch no longer on the global supply line but on the ground line.

The connection between the power switch and the supply rings is made via interconnection holes, more commonly called "vias". A "via" is a vertical metallized hole allowing electric connection between two adjacent layers of an integrated circuit.

The connection between the supply rings and the global and local grids is also made by vias.

With this configuration, a domain surrounded with rings forms a secured entity which, seen at the upper layer, may appear identical to a conventional domain with no rings.

Preferably, the command means, i.e., the control-command device and/or the pre-charge transistors, are positioned under at least one of the supply rings.

Advantageously, the position of the switch transistors of a power switch under the rings is known.

In the preferred embodiment, the device of the invention also comprises at least one command ring configured to bring the command signals to the switch transistors of the power switch. A command ring is a metallization ring dedicated to commanding the power switch, or more exactly to commanding the transistors of the power switch.

In one embodiment, the device of the invention comprises a command ring dedicated to commanding the circuit-breaker on the supply line.

In another embodiment, the device of the invention comprises a command ring dedicated to commanding the power switch on the ground line.

In another embodiment, the device of the invention comprises two command rings, one intended to command the circuit-breaker on the supply line having PMOS transistors, and the other to command the power switch on the ground line having NMOS transistors, making it possible to use power switches on the supply and/or ground lines.

Advantageously, the command signals are conveyed, in the vicinity of the domains, by narrow metallization command rings. These command rings are preferably positioned in the lower metallization layers. In one preferred embodiment, they are positioned in the second metallization layer.

In one embodiment, the command rings are positioned outside the supply rings.

In one preferred embodiment, all the rings (supply and command) are concentric. By concentric it is meant that the arrangement of each ring is such that it has similar perimeter scaling to the domain it surrounds.

In the preferred embodiment, the local supply grids are at the same metal layer as the general supply grid.

Therefore the global routing grid can be partitioned into a plurality of areas, above and around the domains, so as to create one or a plurality of local routing grids, each above a respective supply domain and preferably having substantially the same surface area as the respective domain.

With this partitioning, the global and local grids are positioned at the same metallization layer.

In an embodiment, an integrated System-On-Chip (SOC) circuit comprises: a power domain for each sub-part of an SOC system provided by the integrated SOC circuit; a circuit breaker power switch transistor connected to selectively supply power to the power domain from a global supply, the circuit breaker power switch transistor including a control terminal receiving an analog command signal; and a command circuit which generates the analog command signal to have controlled slew-rate on powering-up of the power domain such that conduction of the circuit breaker power switch transistor is delayed while a pre-charge circuit charges the power domain.

In another embodiment, an integrated System-On-Chip (SOC) circuit comprises: a plurality of circuit sub-parts of an SOC system; and a plurality of power domains, wherein at least one circuit sub-part is associated with one power domain. Each power domain comprises: a circuit breaker power switch transistor having a pair of conduction terminals and a control terminal, the control terminal receiving an analog command signal, a first terminal connected to receive power from a global supply and a second terminal connected to the power domain; and a pre-charge circuit operable on powering-up of the power domain to source a limited first charging current to the power domain from the global supply. The circuit further comprises a command circuit that generates the analog command signal which has a controlled slew-rate on powering-up of the power domain to delay conduction of the circuit breaker power switch transistor so that the circuit breaker power switch transistor sources a second charging current to the power domain from the global supply which does not exceed the limited first charging current.

BRIEF DESCRIPTION OF THE DRAWINGS

A more complete understanding of the method and apparatus of the present invention may be acquired by reference to the following Detailed Description when taken in conjunction with the accompanying Drawings wherein:

FIG. 2 is a schematic, perspective view of part of the device according to the invention;

DETAILED DESCRIPTION OF THE DRAWINGS

Figure 1A:
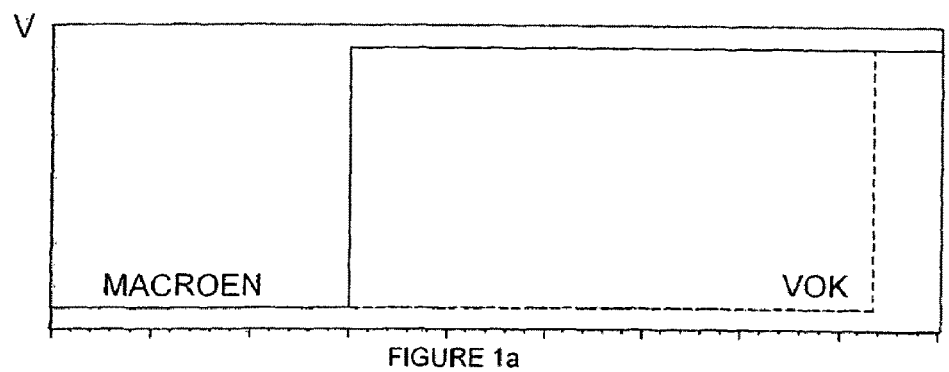
FIG. 1a shows the transitional phase at the time of applying the command signal for (re-)powering-up.
Figure 1B:
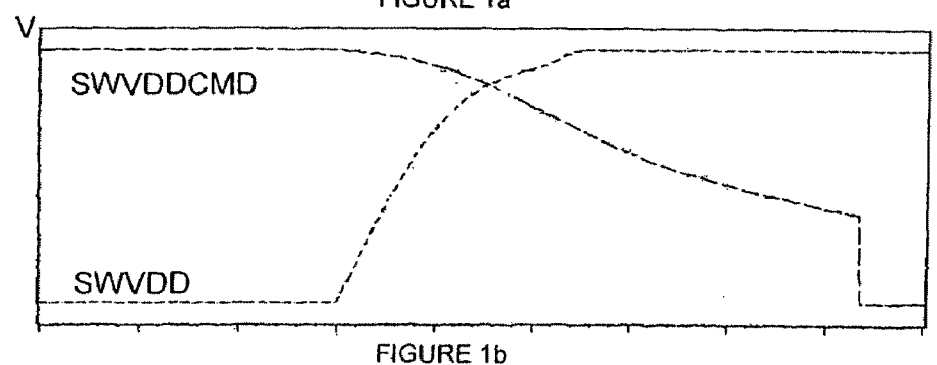
FIG. 1b shows the changes in supply voltages to the domain and in the command signal of the switches.
Figure 1C:
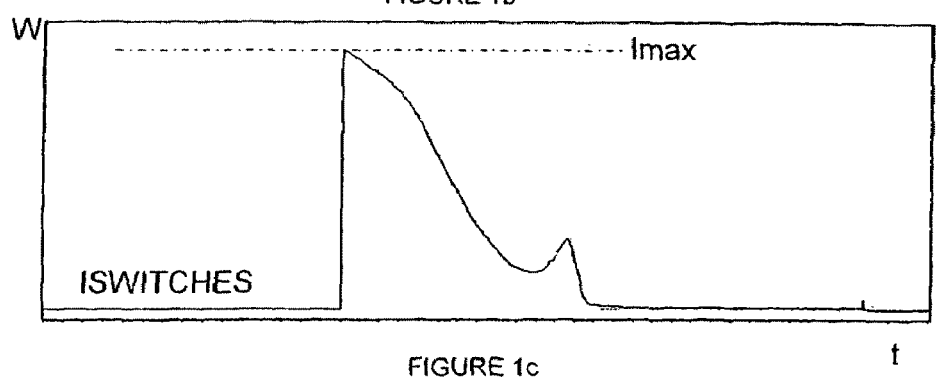
FIG. 1c shows the changes in consumed current during the transitional phase.

All FIGS. 1a, 1b and 1c show signal changes in volts (V) (FIGS. 1a and 1b) or in amperes (FIG. 1c) for one same arbitrary time reference (t).

The present invention proposes a single device for managing the transitional phases, allowing control over the current peak on each powering-up of a domain, the device being interfaced with the remainder of the circuit, e.g., to receive opening/closing commands of the power switch.

A supply domain, or sub-block, that is inactive and non-powered is likened to a discharged capacity. When this sub-block must be activated, it must change from its switched-off state (logic status 0) to its powered state (logic status 1) as shown in FIG. 1a, i.e., the supply management device must supply it with the current necessary for charging its equivalent capacity, as shown FIG. 1c.

The time needed for changeover from logic status 0 to logic status 1, between input MACROEN and output VOK of a domain, is a transitional phase during which the charges (current) are brought to the domain, the domain not being functional during this lapse of time.

This charge rise must be made during a necessarily short time, which causes a current peak (first peak in FIG. 1c) which must be controlled to ensure proper functioning of the circuit.

The shorter the transitional phase, the more rapidly the charges must be conveyed and, in the absolute, to obtain a transitional phase of zero duration it would be necessary to provide an infinite current.

The problem with the peak of current consumption on each powering-up of a switched-off domain is related to the presence of other domains of which some are powered and are functioning.

The supply to a SOC circuit is distributed to all its domains by a global supply grid, and a plurality of local grids. The voltage required for each powering-up of a switched-off domain is therefore necessarily provided by the global supply grid.

However, a global supply grid is sized for the domains contained in the SOC circuit. The voltage needed for each powering-up of a switched-off domain is therefore made, to a certain extent, "to the detriment of" the domains already in operation.

On each powering-up of a domain, the global supply grid undergoes major voltage differences whose consequences, for the domains in operation if the consumption peak is not controlled, may be data losses, calculation errors and even power cut-offs in the most extreme cases.

The problem related to the partitioning of a circuit into domains is to prevent the sudden increase (transitional over-consumption) of current, and the dynamic voltage drop or "IR drop" when the current is restored in a given domain.

These drops in potential may significantly deteriorate the performance of the circuit's logic gates. This deterioration is even greater with new technologies working with lower voltages and transistors which are more sensitive to voltage variations.

Controlling the consumption peak of the current on each powering-up of a supply domain according to the invention is achieved by the structure described below.

The structure of the invention includes in particular:
- a pre-charge mechanism of the supply domain's capacity, preferably integrated in the control-command device CTRL of the consumption peak,
- at least one power switch comprising a plurality of switches between the global and local supply grids, and
- a mechanism for controlling the slew rate of the command signal of the circuit-breaker, integrated in the control-command device, configured to generate an analog command signal.

The circuit-breaker is commanded by a command device which generates a command signal (SWVDDCMD in FIG. 1b). Typically, the command signal is conveyed as far as the grids of the switch transistors (PMOS) of the power switch, and the voltage value of the command signal selectively causes a transistor to change from a blocked status to the pass status or the reverse, thereby connecting or disconnecting the local grid from the global grid. The voltage at the domain terminals changes as shown by the signal SWVDD in FIG. 1b.

Preferably, the pre-charge mechanism of the supply domain's capacity comprises one or more transistors in saturation mounted in parallel. The use of MOS transistors in saturation mode allows the current to pass through the transistor's channel in a manner that is practically independent of the voltage prevailing at its terminals. With this configuration, it is possible to deliver a determined maximum intensity corresponding to the first Imax peak in FIG. 1c.

FIG. 1c shows the changes in consumed current ISWITCHES in a domain during the transitional phase, on the re-powering up of a device according to the invention.

Determination of the maximum intensity Imax is made according to the type of transistors used in this pre-charge mechanism, and to the number thereof placed in activity on each powering-up of the domain.

Advantageously, the pre-charge mechanism comprises selective activation means of the number of pre-charge transistors.

The circuit breaking functions and consumption peak management functions are preferably inserted between the global routing grid and the local routing grid (FIG. 3).

Management of the slope of the voltage signal commanding conduction of the channel in a MOS transistor is also called "slew-rate control" (FIG. 1b). This allows good control over the duration of the changeover from the non-conductive state to the conductive state of the switch transistor, and hence limits the current passing through it. This slew-rate control is applied to the grid of switch transistors of the power switch, and enables adjustment of the dynamics of current creation at the output. These dynamics are adjusted by means of an analog command signal.

Regarding dynamics, when a powering-up command for a supply domain is sent by the global part of the circuit towards the device managing supply to the domain concerned, the means of the structure according to the invention operate as described below.

The pre-charge mechanism injects a controlled current into the capacity of the supply domain, the latter still being inactive. Local voltage therefore increases at a rate imposed by current variation.

At the same time, the slew-rate control mechanism, preferably slowly, causes the voltage of the command signal of the power switch to vary (signal SWVDDCMD in FIG. 1b).

For as long as the threshold voltage of the power switch is not reached, only the pre-harge device consumes power.

When the threshold voltage of the power switch is reached, it starts to close. And, by means of the pre-charge device, the quantity of charge remaining to be supplied to the supply domain is low.

The pre-charge mechanism allows the voltage of the domain to be brought close to its final value, and allows the slew-control mechanism to time-spread the passing of the remaining charge (second current consumption peak in FIG. 1c) and hence to limit the maximum intensity of this second consumption peak.

Therefore through the combined effect of a lesser quantity of charge to be supplied, due to the pre-charge, and relatively resistive behavior of the power switch at this instant, through slew-rate control, the current consumed on closing the power switch is low and at all events remains smaller than the pre-charge current.

The maximum value of the second current consumption peak, corresponding to switching of the circuit-breaker, remains lower than the maximum intensity of the pre-charge current due to the ratio between the equivalent capacity of the domain and the minimum number of switch transistors in the power switch, for a given technology. For example, in 65 nm technology the minimum number of switch transistors of the power switch, i.e., the ratio W/L, is 300 times the equivalent capacity (nF).

From a structural viewpoint, in the preferred embodiment of the invention, the SOC system comprises several supply domains, the domains being delimited by forming rings inside the core of the circuit. Each supply domain is surrounded by an assembly of rings.

FIG. 2 is a schematic, perspective view of an embodiment of the invention comprising a domain DOM surrounded by an assembly of rings.

This assembly comprises several types of rings:
- at least two wide metallizing rings, preferably concentric, defining at least one outer ring CE and one inner ring CI, in which the outer ring supplies outside energy to the supply domain and the inner ring is the supply of the supply domain, and
- at least one narrow metallization ring CMD, preferably arranged outside the wide rings, and enabling the conveying of the command signals.

The embodiment shown in this FIG. 2 comprises two command rings CMD, i.e., one per type of power switch (a PMOS on the supply line and a NMOS on the ground line). In the embodiment in which a single type of power switch is used, on the supply or ground line, only a single command ring CMD is needed.

The outer ring CE and the inner ring CI of the wide metallizing rings are connected together by at least one power switch CC, positioned in the silicon layer Si and whose terminals are directly connected to each of the rings.

The power supply distribution for the entire circuit towards the outer ring, and the power supply of the supply domain from the inner ring can be achieved using the conventional routing grid method.

Typically, a routing grid is a meshing of horizontal and vertical metal rails on two metallization layers, which covers the core of the circuit.

According to the invention the, single, global routing grid GG is partitioned into a plurality of areas, so as to create a plurality of local routing grids LG, each above a respective supply domain, and which are no longer directly electrically interconnected by the metal rails.

The connection of the local routing grids with the global grid is made by vertical VIA connections. In one preferred embodiment these vertical connections are made firstly between the edges of each local routing grid LG and the inner supply ring CI, and secondly between the partitioning edges of the global routing grid GG and the outer supply ring CE.

The device of the invention comprises a control-command device CTRL which particularly includes the pre-charge mechanism (pre-charge transistors PCTr mounted in parallel with the power switch CC) and a slew-rate control mechanism. Preferably this control-command device CTRL is arranged underneath the assembly of rings, in the silicon layer Si. Also preferably, this management device CTRL is directly connected to the narrow command rings CMD as shown by the dotted lines in FIG. 2.

The control-command device CTRL, via the slew-rate control mechanism, generates a command signal shown by an outgoing arrow in FIG. 2, and this signal transits on the narrow metallization rings CMD as far as the power switch CC as represented by the incoming arrow. The control-command device CTRL therefore integrates the command means.

Therefore, the functions of the power switch are inserted between the global routing grid GG and the local routing grid or grids LG.

Through this configuration, the metallization layers used for the routing grids are the same for the management of several supply domains as for a conventional, prior art device.

In addition, within one same supply domain, the local routing grid is of conventional construction as in a circuit only comprising one supply domain. The assembly of the sub-functions of the supply domain can therefore be made using conventional assembly methods. The assembly of the supply domains, then of the overall final circuit, can therefore be seen as a mere change in scale, as shown FIG. 3a.

Figure 3A:
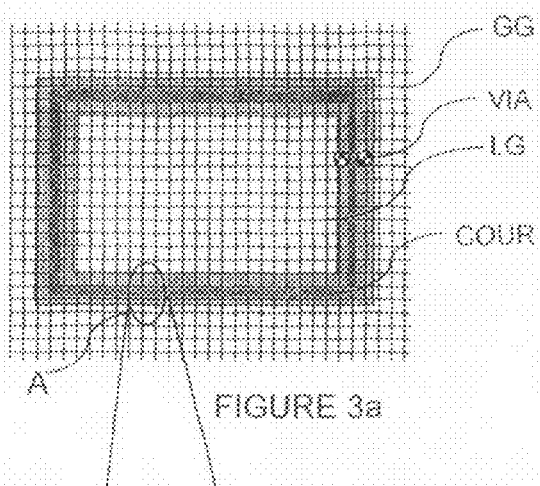
FIG. 3a is an overhead view of a domain of the invention.

FIG. 3a is a schematic illustration of FIG. 2 as seen from overhead. The global grid GG can be seen that is partitioned so as to form a local grid LG. Underneath the grids all the rings COUR can be seen, enabling the grids to be connected together through the vias VIA.

Figure 3B:
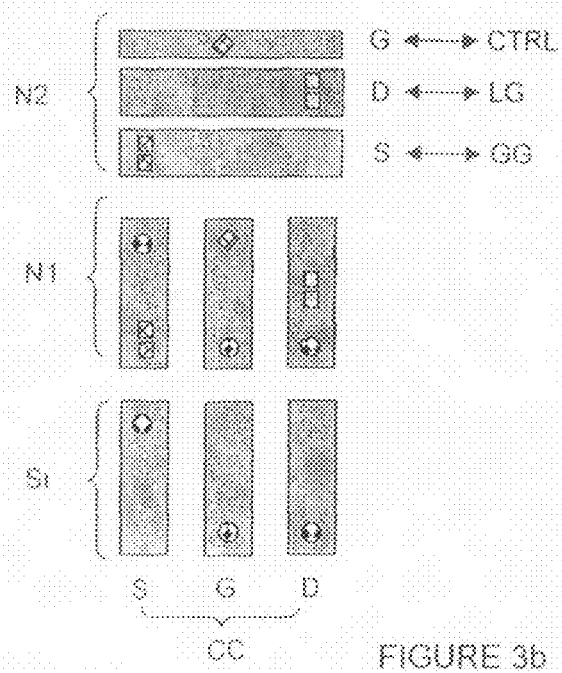
FIG. 3b is an enlarged view of the superimposition of the rings according to the invention.

FIG. 3b is a schematic illustration of area A in FIG. 3a, under the routing grids. This figure is an exploded view of the metallization rings and of the power switch.

The silicon layer Si, the first metallization layer N1 and the second metallization layer N2 are in fact superimposed.

At the silicon layer Si, the power switch CC is formed of a transistor comprising a source S, a gate G and a drain D. The vias connecting a metal layer N to an adjacent layer N+1 are shown by identical graphical symbols between two superimposed layers.

Therefore, the gate G of the power switch is connected to the ring of the second metallization layer N2 by two vias, one between the silicon and the first layer N1, and the other between the first layer N1 and the second layer N2. With this configuration, the gate G is therefore connected to the control-command device CTRL.

Similarly, the source S of the transistor of the power switch is connected to the global grid GG, and the drain D to the local grid LG by means of the metallization rings of the second layer N2 comprising vias between this second layer and the respective grid (not shown FIG. 3b).

Preferably, the power switch CC is made from transistors connected in parallel. The commands of these transistors are all connected to a single metal integrated in a ring CMD and allowing transmission of the command signal of the power switch.

Use is made of the presence of a threshold voltage for the MOS transistors and their more resistive behavior for a command voltage close to this threshold voltage, according to the principle of the slew-rate control mechanism, to reduce the peak of the current passing through the power switch, i.e., to time-spread the charges remaining to be provided in order to charge the equivalent capacity of the supply domain, which corresponds to the second peak in FIG. 1c. With these arrangements, the maximum intensity delivered at the time of the second peak is lower than the maximum intensity Imax delivered by the pre-charge mechanism.

The present invention may also comprise a verification device. One conventional method allowing a comparison to be made between two voltage levels is based on a differential pair. This method has advantages of accuracy and rapidity, but also the disadvantages of complexity through polarization currents, and disadvantages of limited voltage range for the signals to be compared.

The solution of the invention is based on assemblies of current mirrors, the voltages to be compared being converted into currents. One embodiment for the supply voltage is shown FIG. 4.

In the preferred embodiment, the device of the invention comprises detection means, integrated in the control-command device CTRL, and configured to compare the instant value of the supply voltage SWVDD with the value of a fixed reference supply voltage ALIM_REF and/or to compare, with the value of a fixed command voltage, the instant value of the differential voltage between the global supply voltage and the command voltage SWVDDCMD.

Preferably, the value of the fixed reference supply voltage and the value of the fixed reference command voltage are both the voltage delivered by the global supply grid.

The structure of the invention may therefore also comprise:
- a detector, integrated in the control-command device CTRL, allowing verification that the level of the supply voltage of the supply domain is higher than a threshold level, and
- a detector, integrated in the control-command device CTRL, allowing verification that the variation in the command signal of the power switch has varied beyond a threshold level.

The detectors on the inner supply and on the command signal of the power switch detect a high inner voltage and a command signal below the threshold voltage value of the power switch.

Figure 4:
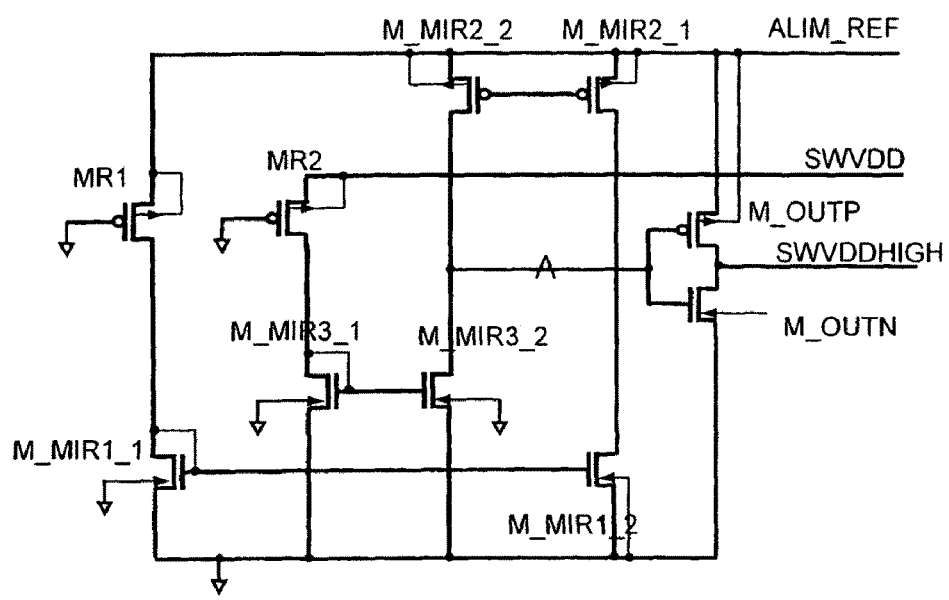
FIG. 4 is a diagram of one embodiment of a current detector with mirrors, for the supply voltage.

Only the detector of the supply voltage level is shown FIG. 4. A similar assembly can be used for the detector on the command line, and shown FIG. 5.

For the detector of the inner supply voltage level, FIG. 4, the objective is to compare the level of this supply SWVDD with the level of the external supply ALIM_REF.

For this purpose, a device similar to a resistance, such as a PMOS MR1 transistor for the reference supply voltage ALIM_REF, and a PMOS MR2 transistor for the domain supply voltage SWVDD, converts the level of each voltage into a current which is copied and multiplied by the current mirror assemblies.

Current copies are generated by a mirror of PMOS type for one thereof and of NMOS type for the other. The outputs of mirrors N and P are connected together. The voltage of this node is therefore dependent on the relative value of the currents copied either side.

Therefore, the current of MR1 is copied by mirror NMOS MIR1 (M_MIR1_1 and M_MIR1_2), then by mirror PMOS MIR2 (M_MIR2_1 and M_MIR2_2).

The current of MR2 is copied by mirror NMOS MIR 3 (M_MIR3_1 and M_MIR3_2) with, in this embodiment, an amplification ratio of three.

The outputs of mirrors MIR2, i.e. PMOS M_MIR_2_2, and MIR3, i.e., NMOS M_MIR_3_2, are connected at a point A.

After shaping by an inverter assembly M_OUTP and M_OUTN in FIG. 4, this voltage becomes the output signal of the detector which is either on the ground or the supply voltage line of the detector in relation to the detected state. The detector threshold is determined by the differential of the amplification ratios of the two currents.

Similarly, the detector in charge of comparing the voltage of the command signal of the power switch SWVDDCMD with the threshold voltage of the power switch, as described above, converts into a current firstly the control voltage and secondly the external supply voltage used as reference.

Through the use of a current mirror device similar to the one just described, a signal is obtained indicating that the voltage of the command signal has varied by a value dependent upon the amplification ratios of the mirrors.

Figure 5:
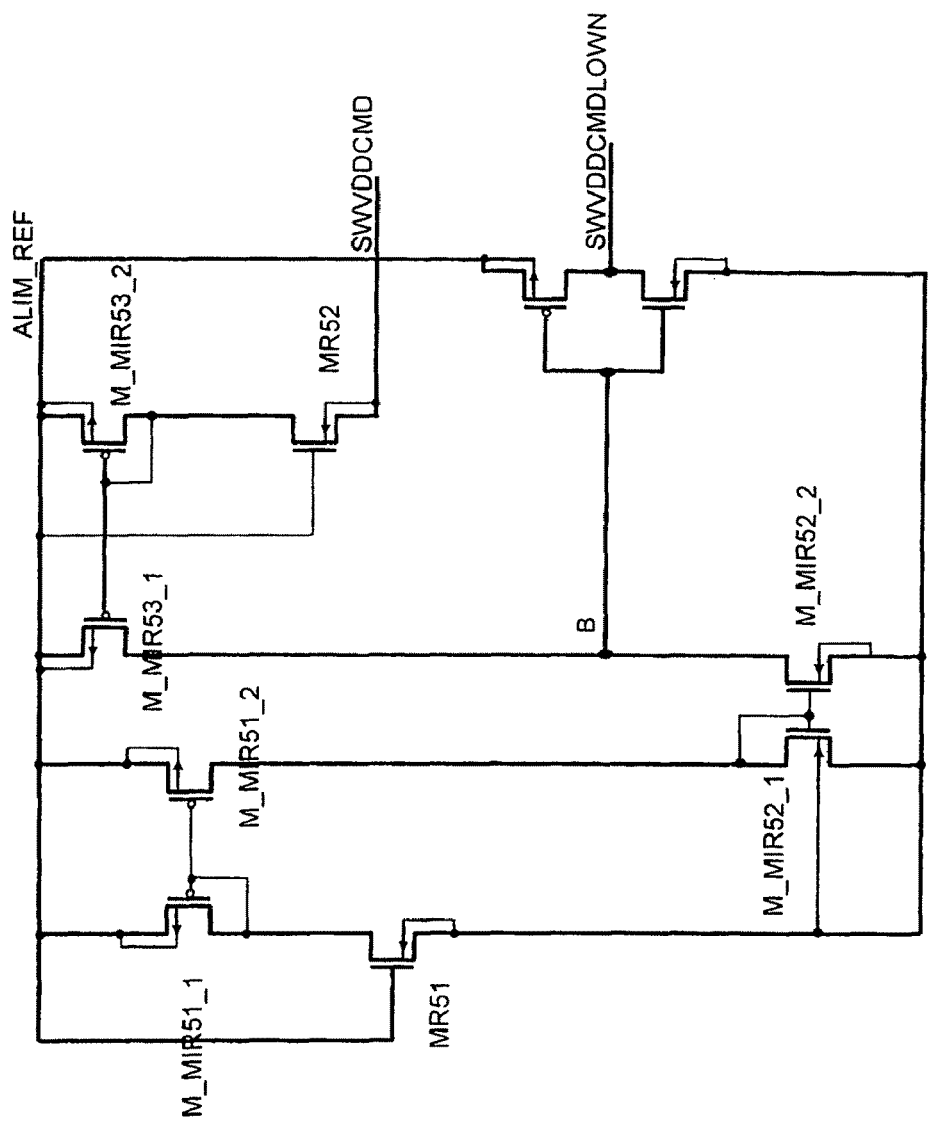
FIG. 5 is a diagram of one embodiment of a current detector with mirrors, for the command voltage.

As shown FIG. 5, a device likened to a resistance, such as a NMOS MR51 transistor for the reference supply voltage ALIM_REF, and a NMOS MR52 transistor for the command voltage SWVDDCMD, converts the level of each voltage into a current which is copied and multiplied by the current mirror assemblies.

Unlike the detector on the supply line, shown FIG. 4 and in which the voltage is measured with respect to ground, the voltage here is measured with respect to the supply voltage.

The current of MR51 is copied by mirror PMOS MIR51 (M_MIR51_1 and M_MIR51_2) with, in this embodiment, an amplification ratio of three, then by mirror NMOS MIR52 (M_MIR52_1 and M_MIR52_2).

The current of MR52 is copied by mirror PMOS MIR53 (M_MIR53_1 and M_MIR53_2) with, in this embodiment, an amplification ratio of nine.

The outputs of mirrors MIR52, i.e., transistor NMOS M_MIR52_2, and MIR53, i.e., transistor PMOS M_MIR53_2, are connected at a point B.

Shaping is achieved by a NMOS PMOS inverter assembly between point B and the output SWVDDCMDLOWN in FIG. 5.

The polarity of the output signal SWVDDCMDLOWN is such that its voltage is zero when the value of the command signal SWVDDCMD is below the threshold.

With this configuration, the solution of the invention no longer requires a polarization current. In addition, thresholds can advantageously be used that are close to the supply voltage or to ground.

The combination of these two detections forms the end of the transitional (re)powering-up phase. The command signal is then placed in closed power switch position so that the power switch has low resistance. Similarly, a signal is generated to indicate to the external part of the circuit that the supply domain is henceforth correctly supplied and may become active.

The output signal VOK in FIG. 1a is the logic AND combination of the logic signals derived from the two detections. This combination is in logic status 1 when a high internal voltage level and a low switch grid level is detected.

When this output signal is in logic status "1", the SOC replaces the domain in operation, in particular by resetting the clocks and flip-flops.

Although preferred embodiments of the method and apparatus of the present invention have been illustrated in the accompanying Drawings and described in the foregoing Detailed Description, it will be understood that the invention is not limited to the embodiments disclosed, but is capable of numerous rearrangements, modifications and substitutions without departing from the spirit of the invention as set forth and defined by the following claims.

What is claimed is:

1. A device for managing the current consumption peak on each powering-up of a domain, comprising:
   a System-On-Chip (SOC) system which includes a plurality of domains and a global power supply grid, each domain being selectively supplied by a local power supply grid connected to the global supply grid via a power switch commanded by a control circuit integrated in a control-command device;
   at least one pre-charge transistor connected in parallel with the power switch between the global supply grid and the local power supply grid; and
   wherein the control circuit for the power switch is configured to generate an analog command signal whose slew-rate is controlled.

2. The device in claim 1, wherein each pre-charge transistor is configured to function in saturation mode on each powering-up of the domain, so as to function as a current source delivering a determined maximum intensity.

3. The device in claim 2, wherein the control circuit is configured so that a current passing through the power switch on powering-up is always lower than the determined maximum intensity delivered by the pre-charge transistor.

4. The device in claim 2, comprising several pre-charge transistors, and wherein the value of the determined maximum intensity delivered by the pre-charge transistors is dynamically adaptable by selecting the number or size of the active pre-charge transistors.

5. The device of claim 1, further comprising detection means, integrated in the control-command device, and configured to compare an instant value of a supply voltage with a value of a fixed reference supply voltage.

6. The device of claim 1, wherein the power switch and/or the pre-charge transistor are mounted on the periphery of the domain.

7. A device for managing the current consumption peak on each powering-up of a domain, comprising:
   a System-On-Chip (SOC) system which includes a plurality of domains and a global power supply grid, each domain being selectively supplied by a local power supply grid connected to the global supply grid via a power switch commanded by a control circuit integrated in a control-command device;
   at least one pre-charge transistor connected in parallel with the power switch between the global supply grid and the local power supply grid; and
   wherein the control circuit for the power switch is configured to generate an analog command signal whose slew-rate is controlled; and
   further comprising at least one first outer supply ring supplying outside power to the domain, by connection between this outer ring and a global supply grid, and a second inner supply ring supplying inside power to the domain, by connection between this inner ring and a local supply grid, one of these rings being connected to an input and the other to an output of the power switch.

8. The device of claim 7, further comprising at least one command ring configured to bring the command signals to the power switch.

9. The device in claim 8, wherein the command ring is positioned outside the supply rings.

10. The device of claim 7, wherein the control-command device and/or the pre-charge transistors are positioned under at least one of the supply rings.

11. The device of claim 7, wherein the global routing grid is partitioned into a plurality of areas, so as to create a plurality of local routing grids each above a respective supply domain.

12. An integrated System-On-Chip (SOC) circuit, comprising:
a power domain for each sub-part of an SOC system provided by the integrated SOC circuit;
a circuit breaker power switch transistor connected to selectively supply power to the power domain from a global supply, the circuit breaker power switch transistor including a control terminal receiving an analog command signal;
a pre-charge circuit transistor adapted to charge the power domain from the global supply; and
a command circuit which generates the analog command signal to have controlled slew-rate on powering-up of the power domain such that conduction of the circuit breaker power switch transistor is delayed while the pre-charge circuit transistor charges the power domain.

13. The circuit of claim 12 wherein the pre-charge circuit comprises at least one transistor, actuated in saturation on powering-up of the power domain.

14. The circuit of claim 13 wherein the at least one transistor is mounted in parallel with the circuit breaker power switch transistor.

15. An integrated System-On-Chip (SOC) circuit comprising:
a power domain for each sub-part of an SOC system provided by the integrated SOC circuit;
a circuit breaker power switch transistor connected to selectively supply power to the power domain from a global supply, the circuit breaker power switch transistor including a control terminal receiving an analog command signal; and
a command circuit which generates the analog command signal to have controlled slew-rate on powering-up of the power domain such that conduction of the circuit breaker power switch transistor is delayed while a pre-charge circuit charges the power domain;
wherein the delay in conduction of the circuit breaker power switch transistor ensures, during powering-up, that a current passing through the circuit breaker power switch transistor is less than a current passing through the pre-charge circuit.

16. An integrated System-On-Chip (SOC) circuit comprising:
a power domain for each sub-part of an SOC system provided by the integrated SOC circuit;
a circuit breaker power switch transistor connected to selectively supply power to the power domain from a global supply, the circuit breaker power switch transistor including a control terminal receiving an analog command signal;
a command circuit which generates the analog command signal to have controlled slew-rate on powering-up of the power domain such that conduction of the circuit breaker power switch transistor is delayed while a pre-charge circuit charges the power domain; and
further comprising a pair of supply rings surrounding the power domain, wherein conduction terminals of the circuit breaker power switch transistor are connected to the pair of rings, and wherein an inner ring supplies power to the power domain and an outer ring receives power from the global supply.

17. An integrated System-On-Chip (SOC) circuit, comprising:
a plurality of circuit sub-parts of an SOC system;
a plurality of power domains, wherein at least one circuit sub-part is associated with one power domain, and each power domain comprising:
a circuit breaker power switch transistor having a pair of conduction terminals and a control terminal, the control terminal receiving an analog command signal, a first terminal connected to receive power from a global supply and a second terminal connected to the power domain; and
a pre-charge circuit operable on powering-up of the power domain to source a limited first charging current to the power domain from the global supply; and
a command circuit that generates the analog command signal which has a controlled slew-rate on powering-up of the power domain to delay conduction of the circuit breaker power switch transistor so that the circuit breaker power switch transistor sources a second charging current to the power domain from the global supply which does not exceed the limited first charging current.

18. The circuit of claim 17 wherein the pre-charge circuit comprises at least one transistor, actuated in saturation on powering-up of the power domain.

19. The circuit of claim 18 wherein the at least one transistor is mounted in parallel with the circuit breaker power switch transistor.

20. The circuit of claim 17 further comprising a pair of supply rings surrounding the power domain, wherein the first and second conduction terminals of the circuit breaker power switch transistor are connected to ones of the pair of rings, respectively, and wherein an inner ring supplies power to the power domain and an outer ring receives power from the global supply.

21. A device, comprising:
a plurality of power domains and a global power supply grid, each power domain being selectively supplied by a local power supply grid connected to the global supply grid via a power switch;
a control circuit adapted to generate an analog command signal, whose slew-rate is controlled, for application to the power switch;
at least one pre-charge transistor mounted in parallel with the power switch; and
a detection circuit adapted to compare an instant value of a supply voltage on the local power supply grid with a value of a fixed reference supply voltage to output a signal indicative of power status.

22. A device, comprising:
a plurality of power domains and a global power supply grid, each power domain being selectively supplied by a local power supply grid connected to the global supply grid via a power switch;
a control circuit adapted to generate an analog command signal, whose slew-rate is controlled, for application to the power switch;
at least one pre-charge transistor mounted in parallel with the power switch, the pre-charge transistor configured to function in saturation mode as a current source to deliver a current of certain intensity; and
wherein a current passing through the power switch is always lower than the certain intensity of current delivered by the pre-charge transistor.

* * * * *

UNITED STATES PATENT AND TRADEMARK OFFICE
CERTIFICATE OF CORRECTION

| | | |
|---|---|---|
| PATENT NO. | : 7,671,623 B2 | Page 1 of 1 |
| APPLICATION NO. | : 11/701973 | |
| DATED | : March 2, 2010 | |
| INVENTOR(S) | : Fabrice Blisson | |

It is certified that error appears in the above-identified patent and that said Letters Patent is hereby corrected as shown below:

In the Specification:

At Column 7, line 67, please delete the word

"pre-harge"

and insert the corrected word

-- pre-charge --

Signed and Sealed this

Seventeenth Day of May, 2011

David J. Kappos
*Director of the United States Patent and Trademark Office*